United States Patent [19]

Seymour

[11] Patent Number: 4,470,837
[45] Date of Patent: Sep. 11, 1984

[54] SPLIT RING-LIKE SUPPORT MEMBER OF ADJUSTABLE LENGTH FOR SHAPING GLASS SHEETS

[75] Inventor: Samuel L. Seymour, Oakmont, Pa.

[73] Assignee: PPG Industries, Inc., Pittsburgh, Pa.

[21] Appl. No.: 443,258

[22] Filed: Nov. 22, 1982

[51] Int. Cl.³ .............................................. C03B 23/02
[52] U.S. Cl. ....................................... 65/291; 65/106; 65/107; 65/273; 65/351
[58] Field of Search ................. 65/104, 106, 107, 114, 65/115, 273, 291, 351

[56] References Cited

U.S. PATENT DOCUMENTS

| | | |
|---|---|---|
| 2,176,999 | 10/1939 | Miller . |
| 2,857,713 | 10/1958 | Cleminson . |
| 2,876,594 | 3/1959 | McRoberts et al. . |
| 2,977,719 | 4/1961 | Devore . |
| 3,192,029 | 6/1965 | Black ................................ 65/291 X |
| 3,484,226 | 12/1969 | Golightly .............................. 65/291 |
| 3,741,743 | 6/1973 | Seymour ............................... 65/287 |
| 3,762,903 | 10/1973 | Hamilton ............................... 65/107 |
| 3,762,904 | 10/1973 | Hamilton et al. ...................... 65/107 |
| 3,973,943 | 8/1976 | Seymour ............................... 65/348 |
| 4,119,428 | 10/1978 | DeAngelis et al. .................... 65/287 |
| 4,185,986 | 1/1980 | Frank .................................... 65/287 |
| 4,252,552 | 4/1981 | Frank .................................... 65/106 |
| 4,277,276 | 7/1981 | Kellar et al. ....................... 65/107 X |
| 4,331,464 | 5/1982 | Claassen et al. ....................... 65/273 |

Primary Examiner—Arthur Kellogg
Attorney, Agent, or Firm—Donald Carl Lepiane; Edward I. Mates

[57] ABSTRACT

The present invention relates to a ring-like member for use in a glass sheet bending and tempering process most adapted to a process wherein a glass sheet is released from engagement against a vacuum mold of a shape having sharply bent regions about longitudinally spaced, transversely extending lines of relatively sharp bending onto said ring-like member. The vacuum mold has a distance between the sharply bent regions at operating conditions that either equals or is slightly less than the distance desired in the bent glass. In a preferred embodiment, the ring-like member is split into two shaping rails, which are separable to adjusted positions wherein the sharply bent regions are spaced to conform to the distance desired therebetween in the bent glass sheet.

5 Claims, 5 Drawing Figures

SPLIT RING-LIKE SUPPORT MEMBER OF ADJUSTABLE LENGTH FOR SHAPING GLASS SHEETS

BACKGROUND OF THE INVENTION

1. Field of the Invention

The present invention relates to an outline mold useful in the shaping and tempering of large glass sheets to non-uniform shape. More specifically, the present invention relates to using a ring-like member as an outline mold in conjunction with a vacuum mold that engages a glass sheet for shaping to a non-uniform shape incorporating longitudinally spaced portions bent relatively sharply and that releases the sheet after preliminary shaping for deposit onto the ring-like member of suitable shape for transporting the shaped sheet from a shaping station to a cooling area.

2. Description of Technical Background and Patents of Interest

The shaping of large glass sheets to shallow shapes has been accomplished in recent years by a method that involves engaging a heat softened glass sheet by vacuum against a vacuum mold having approximately the shape desired for the glass sheet. The glass is lifted on a shaping mold that engages the non-rectangular outline of the sheet and lifts it into close adjacency to a vacuum mold having a downward facing shaping surface of approximately the curvature desired for the glass sheet. Suction supports the bent glass sheet throughout substantially its entire extent against the downward facing shaping surface of the vacuum mold. The lifting member is lowered to provide space for a ring-like member to move into a position below the vacuum mold. When the ring-like member arrives at the position below the vacuum mold, the bent glass sheet is released and permitted to drop onto the ring-like member. The ring-like member transfers the glass sheet to a cooling station where a temper is imparted by rapid cooling.

The art of bending glass sheets involving the dropping of a shaped glass sheet from a vacuum mold onto a ring-like member is relatively simple to accomplish when the glass is shaped about a gentle curvature or has a uniform radius of curvature. However, when the glass is bent to a non-uniform radius of curvature, it is extremely important that the sharply bent portions defined by the ring-like member be aligned precisely beneath the corresponding sharply bent portions defined by the downward facing surface of the vacuum mold. If the sharply bent portions defined by the vacuum mold are not in proper alignment with the corresponding sharply bent portions defined by the ring-like member, the glass sheet will have end portions of different lengths. If sufficiently different in length, the bent glass sheet is unsuitable for fitting within a frame of the vehicle in which it is to be installed.

Since the vacuum mold is located within the exit end of a furnace or above a hearth block just outside the exit of the furnace, it is subject to continuous exposure to the relatively hot temperature radiated by the furnace or the hearth block during a production run. The ring-like member that transfers the bent glass sheet between the shaping station and the cooling station is alternately exposed to the hot temperature of the furnace, heat-softened glass sheet and hearth block when at the shaping station and to the lower temperature provided by cold blasts of air or other tempering medium at the cooling station. Thus, it is relatively easy to estimate the thermal expansion of the distance between the sharply bent portions of the downward facing surface of the vacuum mold between room temperature at which the vacuum mold is fabricated and the temperature range that the mold attains during a production run. The ring-like member, on the other hand, expands thermally a lesser distance between the sharply bent portions. However, the thermal expansion of the ring-like member during a production run is more difficult to predict that that of the vacuum mold because of the cyclic movement of the ring-like member between the relatively hot shaping station and the relatively cool cooling station. To further complicate the arrangement of the vacuum mold and the outline mold comprising said ring-like member, the glass sheet is transferred from the vacuum mold to the outline mold at an elevated temperature that may differ from major surface to major surface, and contracts to its desired ultimate shape at room temperature throughout its extent and thickness. The glass sheet must meet the customer specifications when checked at room temperature to insure its proper installation into a curved frame of a vehicle that receives the bent, tempered glass sheet.

For reasons just mentioned, it is difficult to compensate the initial distance between sharply bent portions along the ring-like member compared to the corresponding distance along the vacuum mold in order to avoid problems in transferring bent glass from a vacuum mold to a ring-like member of outline configuration. If the distance between the sharply bent portions of the shaping surface defined by the ring-like member onto which the hot glass sheet is dropped is less than the corresponding distance in the vacuum mold from which the hot glass sheet is released, it is difficult to settle the portions of the glass sheet to be bent sharply into the sharply bent regions of the ring-like member. If the distance between the sharply bent regions along the ring-like member are too much longer than the desired dimension for the bent glass sheet to insure that the hot glass sheet settles into the sharply bent regions of the ring-like member, the glass sheet will tend to develop a central portion that is too long. A sheet so bent will fail to fit in the curved frame within which it is to be mounted in the vehicle for installation. Once the relative shape of the vacuum mold and the ring-like member have been established at room temperature based on an improper estimate of the corrections needed for the higher temperatures of the vacuum mold and the cyclic temperature range of the ring-like member, it becomes very difficult to make a change to conform the glass sheet to the desired shape.

Typical prior art molds for bending glass sheets or for bending and tempering glass sheets have included molds having gaps disposed at the center thereof to receive electrodes for heaters within the gaps. U.S. Pat. Nos. 2,176,999 to Miller; 3,762,903 to Hamilton and 3,762,904 to Hamilton et al. disclose molds for bending glass sheets to relatively sharp angles that incorporate gaps to receive electrodes so as not to interfere with the mold shaping functions of the mold. The Hamiltion and Hamilton et al. molds are of the outline type.

U.S. Pat. No. 2,857,713 to Cleminson discloses outline molds that are provided at their center and also supported for pivoting at points intermediate the center and ends of the mold so that when a glass sheet softens, a pair of shaping rails pivot into a continuous closed mold position to define the outline of a glass sheet to be bent. The heat softened glass sheet supported on the mold drops to conform to the shape of the mold.

U.S. Pat. No. 2,977,719 to Devore discloses a split type of outline bending mold in which one of a pair of shaping rail sections is pivotally mounted on inner and outer hinges while the other split rail section is rigidly supported on a mold support structure. A glass sheet acts as a strut between end stops to maintain the rail sections separated until it softens and the hingedly supported section moves toward the other shaping rail section. The movable shaping rail section moves inward and downward during the closing of the mold.

U.S. Pat. No. 2,876,594 to McRoberts et al. discloses a split ring mold of convex elevation having a connection between the split ring portions at the mold center to help modify the angle between the mold portions to support sheets of slightly different elevational configuration.

U.S. Pat. No. 3,484,226 to Golightly discloses an outline mold comprising four rail sections interfitted relative to one another to form different outline shapes.

U.S. Pat. No. 3,741,743 to Seymour discloses a sheet shaping frame comprising inner and outer shaping rails spaced apart and supporting a screen mesh that bridges across the gap between the spaced rails to provide a reinforced lightweight support for the outline of a glass sheet.

U.S. Pat. No. 3,973,943 to Seymour discloses a ring-like member of a low heat transfer material reinforced with a metal rail for conveying shaped glass sheets between a shaping station and a cooling station. This patent also discloses how the ring-like member is supported on rigid reinforcing means forming part of a carriage that transports the ring-like member between the shaping station and the cooling station.

U.S. Pat. No. 4,119,428 to DeAngelis et al. discloses an outline bending mold of the gravity sag type having a plurality of split sections extending in end-to-end relation around the perimeter of the mold. Means is provided to adjust each of the sections locally in a direction transverse to the outline shape to modify the outline shape near each split.

U.S. Pat. No. 4,185,986 to Frank and 4,331,464 to Claassen et al. disclose as open ended ring-like member having a split leading edge portion for use with glass sheet bending apparatus that incorporates a vacuum mold. The split in the leading edge portion facilitates moving the downstream end of the ring-like member relative to means that remove the glass sheet from the ring-like member. The split ring-like members of these patents are not adjustable in length.

U.S. Pat. No. 4,252,552 to Frank discloses apparatus for shaping and tempering glass sheets that comprises a vacuum mold of a given shape that engages a heat-softened glass sheet by vacuum to develop a shape conforming to that of the vacuum mold and releases the shaped glass sheet to drop by gravity onto an outline ring-like member that defines a shape of the same or different radius of curvature. For example, this patent uses a vacuum mold defining a curvature having a radius of 48 inches (122 cm) with ring-like members defining shapes ranging from 43 inches (109 cm) to 60 inches (152 cm). While the apparatus of this patent works well to produce bent glass sheets of shallow curvature in the ranges mentioned and also to form shapes of gradually varying radii of curvature, the apparatus of this patent is not designed to overcome certain problems in shaping glass sheets having sharply bent portions that change radius rapidly to sharp bends having radii less than about 24 inches (60 cm) and even as little as 6 inches (15 cm).

While the prior art just discussed comprises split rings, there is no reference of which the inventor is aware showing split ring structure for a ring-like mold having a shaping surface defining spaced sharply bent portions and comprising two separate shaping rails spaced apart to make the mold adjustable in length to provide a variation in the distance between sharply bent portions so that a glass sheet may be transferred from a vacuum mold without hanging up on an outline mold or forming a bend on dropping by impact onto the mold shaping surface that has sharply bent portions spaced too far apart to meet the tolerances required by the customer for acceptable fit within a frame in which the bent window is to be installed.

SUMMARY OF THE INVENTION

The present invention comprises a split ring-like member used as an outline mold for shaping glass sheets to a shape of concave elevational configuration including regions of rapidly changing radii of curvature to sharp curvatures less than 24 inches (60 cm) in radius that comprises means for adjusting the length of the split outline mold without changing the orientation of either split portion of the mold as its length is changed. This enables an operator to correlate the distance along the ring-like member between the sharply bent portions under production conditions to conform to the corresponding distance along the vacuum mold under production conditions so as to enable a glass sheet that is released from vacuum engagement against the vacuum mold to drop onto the proper locations, particularly the sharply bent portions of the ring-like member. The resulting bent glass sheet is within tolerances required by the customer and also the end portions of the bent glass sheet beyond the sharply bent portions are of substantially equal length as required. While not limiting thereto, the present invention is especially suitable for shaping glass sheets to non-uniform bends including spaced portions having radii less than 24 inches (60 cm) and even less than 6 inches (15 cm).

In a specific embodiment of the present invention, a glass sheet is shaped to its approximate shape by engagement against a downward facing surface of concave elevation of a vacuum mold having a non-uniform shape approximating the desired shape including sharply bent regions spaced apart at operating temperature by a distance not exceeding the corresponding distance along the ring-like member and preferably less than said distance at the operating temperature of the latter. The engaged sheet then is released from vacuum engagement to fall onto the outline mold of the present invention. The latter is split into two separate rigid shaping rails for positional adjustment to align properly under the vacuum mold, particularly in the sharply bent portions. These relatively sharply bent portions of the outline mold are located either directly below the relatively sharply bent portions of the vacuum mold or longitudinally outward of said latter sharply bent portions to assure that the glass sheet is received within both sharply bent portions of the outline mold and conforms to the shape of the outline mold.

The benefits of the present invention will be understood more clearly in the light of a description of a specific embodiment of the invention which follows.

BRIEF DESCRIPTION OF THE DRAWINGS

In the drawings that form part of a description of the present invention and wherein like reference numbers refer to like structural elements.

DESCRIPTION OF THE PREFERRED EMBODIMENT

Figure 1:
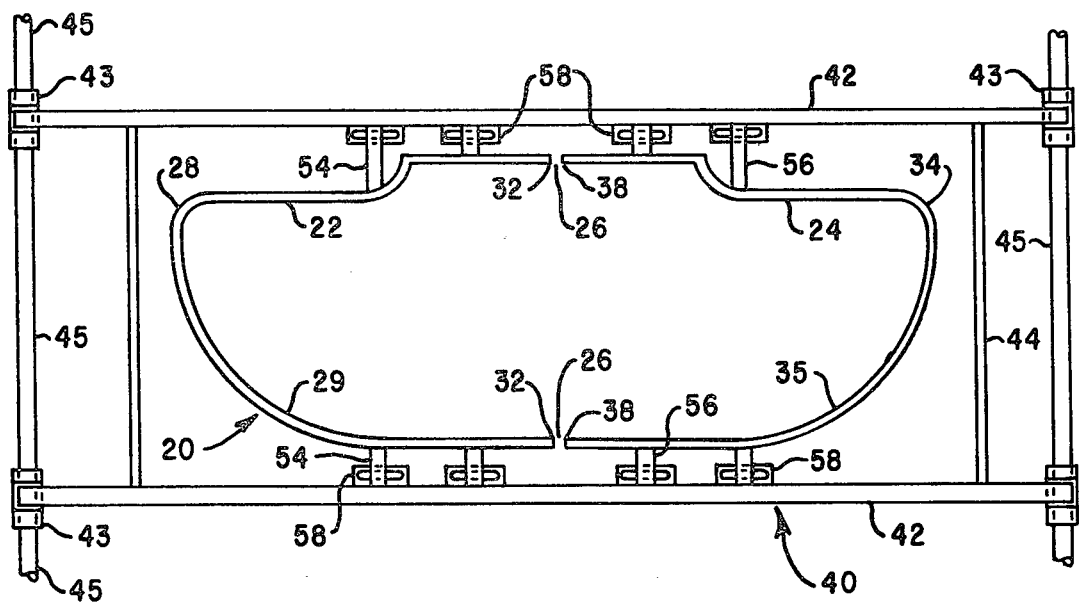
FIG. 1 is a plan view of a split ring-like member having means for adjusting the distance between sharply bent portions of its defined elevational shape according to the present invention.
Figure 2:
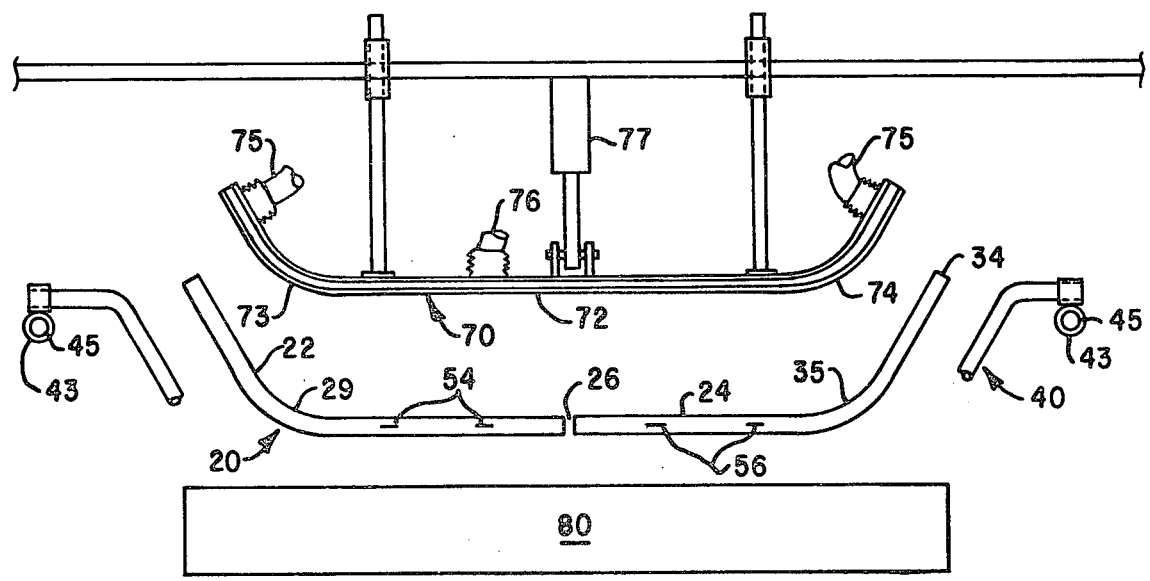
FIG. 2 is a fragmentary, elevational view of the split ring-like member of FIG. 1 showing it in position above a hearth block and beneath a vacuum mold of conforming shape in the position that the split ring-like member occupies at a shaping station preparatory to transferring a bent glass sheet from the vacuum mold to the split ring-like member of the present invention.

With special reference to FIG. 1, a split ring-like member 20 conforming to the present invention comprises a first continuous shaping rail 22 and a second continuous shaping rail 24 having their inner ends separated from one another along a common horizontal plane to form a narrow gap 26 therebetween. Referring now to FIG. 2, first shaping rail 22 has a closed, upper, outer end portion 28, an intermediate portion 29 bent about a first transverse axis of sharp bending and longitudinally extending lower inner end portions 32 that terminate at the split or gap 26 between the shaping rails.

The second shaping rail 24 has in an essentially horizontal plane common to outer end portion 28 a closed, upper, outer end portion 34 which extends to form a sharply bent intermediate portion 35 bent about a second transverse axis of sharp bending and terminates in lower inner end portions 38 that terminate on the opposite side of the gap 36 which is located at the transverse center line of the split ring-like member 20. The sharply bent intermediate portion 35 is in an essentially horizontal plane common to intermediate portion 29.

Reinforcement means 40 in the form of a carrying frame is disposed in surrounding relation to the split ring-like member 20 comprising the first shaping rail 22 and second shaping rail 24. The reinforcement means 40 comprises elongated shaped bar members 42 interconnected beyond the closed upper outer ends 28 and 34 of the shaping rails by transverse bar members 44. The elongated bar members 42 terminate in sleeves 43 secured to carriage transfer elements in a manner well known in the art to move the carriage and the mold attached thereto along a pair of transversely spaced tracks 45 engaged by sleeve 43 of the mold reinforcement means 40 to transfer the split ring-like member 20 including the shaping rails 22 and 24 and a glass sheet supported thereon for movement from a shaping station as shown in FIG. 2 to a cooling station (not shown) in a manner well known in the art. The mold reinforcement means 40 is thus centrally aligned relative to the path taken by glass sheets between the shaping station and the cooling station.

Figure 3:
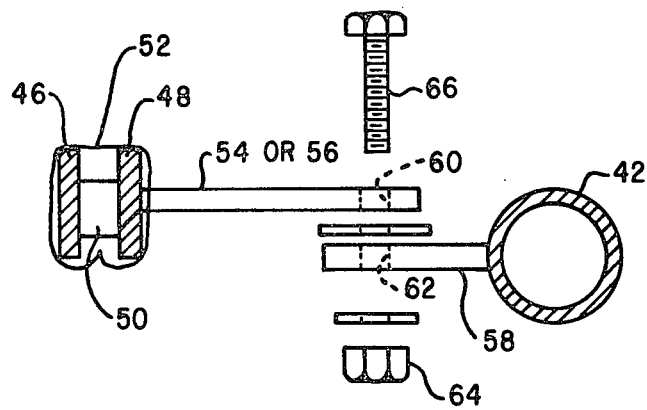
FIG. 3 is an exploded sectional view showing the elements of a device for adjustably securing a split ring-like member of the present invention to reinforcement means.
Figure 5:
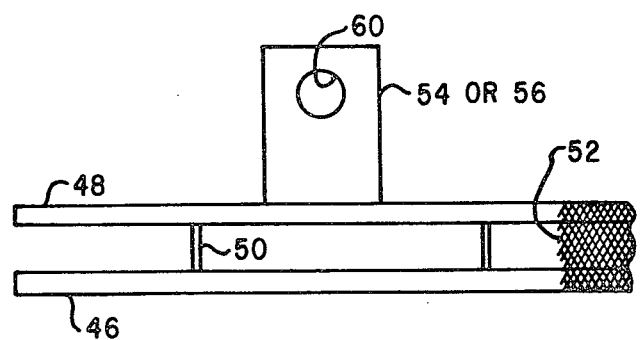
FIG. 5 is a fragmentary plan view of another of the elements of the adjustable securing device of FIG. 3.

While the cross-section of the shaping rails forming the outline mold may be of any desired configuration, a preferred structure depicted in FIGS. 3 and 5 shows inner and outer rails 46 and 48 spaced transversely of the length of the mold through spacer elements 50 and a wire mesh 52 bridging the upper edges of the inner and outer rails 46 and 48 to form a support for the edge of a glass sheet G intermediate the inner and outer rails. Further details of the shaping rail construction may be found in U.S. Pat. No. 3,741,743, the disclosure of which is incorporated herein by reference.

The split ring-like member 20 is adjustably secured to the reinforcement means 40 in a manner such that the first shaping rail 22 and the second shaping rail 24 may be moved longitudinally of the length of the reinforcement means 40 without disturbing the vertical positions occupied initially by the closed upper outer end portions 28 and 34 and the lower inner end portions 32 and 38 of the shaping rails 22 and 24, respectively. In order to obtain this adjustable arrangement, a number of tabs 54 extend laterally outward from the first shaping rail 22 and additional tabs 56 extend outward from the second shaping rail 24. A plurality of tabs 58 extend inward from their points of attachment to the reinforcement means 40. One tab 58 is provided to correspond with each tab 54 and 56 and is located along the length of the reinforcement means 40 in alignment with its corresponding laterally outwardly extending tab 54 or 56.

Figure 4:
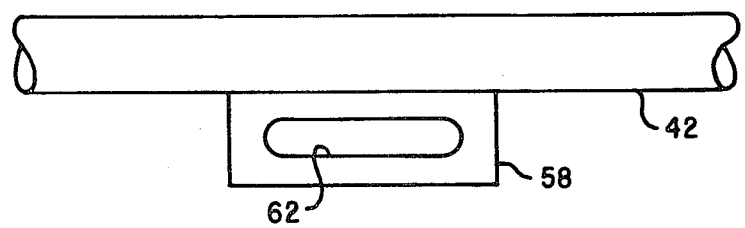
FIG. 4 is a fragmentary plan view of one of the elements of the adjustable securing device of FIG. 3.

In the embodiment shown, each of the tabs 54 and 56 is provided with a round hole 60 and each of the tabs 58 is provided with an elongated slot in the direction of the length of the reinforcement means. A nut 64 and a bolt 66 is provided to secure each tab 54 or 56 in desired position along the length of a corresponding tab 58 extending inward from the reinforcement means 40. It should be understood, however, that while the tabs 58 are shown as having elongated slots 62 (FIG. 4) and the tabs 54 and 56 as having round holes, 60 (FIG. 5) that the reverse could exist to enable the shaping rails of the split ring-like member to be separated to control the width of the gap or split 26 between the inner ends 32 and 38 of the first and second shaping rails. The arrangement of tabs 54, 56 and 58 in either case provides means to control the relative movement of the shaping rails relative to the length of the reinforcement means 40. The elongated slots 62 in slotted tabs 58 constrain the movement of the shaping rails so that when the latter are moved in the direction of the longitudinal slots, their upper outer end portions and their lower inner end portions are not removed from the horizontal planes they occupy prior to adjusting their relative longitudinal positions. The nuts and bolts cooperate with the tabs to provide means securing the shaping rails in fixed longitudinally adjustable positions relative to the length of the reinforcement means 40.

In FIG. 2, the split outline mold comprising shaping rails 22 and 24 is shown beneath a vacuum mold 70. The latter has a downward facing apertured wall 72 having a shape conforming to that desired for the glass sheet supported thereagainst by vacuum including sharply bent portions 73 and 74. Vacuum is provided by suction through apertures in the downwardly facing shaping wall 72 of the vacuum mold 70. The vacuum mold may be sectionalized with vacuum conduits 75 communicating the end sections and a central vacuum conduit 76 communicating the central section to one or more vacuum sources (not shown). Piston means 77 is provided to raise or lower the vacuum mold 70 as needed. If desired, a cover of fiber glass cloth may be used in order to protect the heat softened glass sheet from direct contact with the downward facing wall of the vacuum mold 70. Also shown in FIG. 2, beneath the position occupied by the split ring-like member 20 is a hearth block 80, which provides a gas bed over its upper surface for floating a glass sheet that enters the shaping station and has a peripheral groove that receives a vertically movable shaped lifting ring (not shown) to lift a heat-softened glass sheet toward the vacuum mold. This apparatus is similar to the shaping station including the support bed extension 19 of U.S. Pat. No. 3,846,104 to Samuel L. Seymour, the disclosure of which is incorporated herein by reference for information about further details of its construction.

It is well known in the shaping of glass sheets that a vacuum mold helps to support a glass sheet by vacuum until the sheet is released to transfer by falling to the ring-like member. However, when the glass sheet has regions 29 and 35 of sharp bending, if the distance between the sharply bent portions on the vacuum mold is greater than the corresponding distance on the ring-like member during this transfer or falling step, the glass will not settle properly into the ring-like member. In the past, using ring-like members of continuous outline configuration, even those that were split along one side only were difficult to adjust to correct the length between the sharply bent portions. It was also difficult to adjust the shape of the vacuum mold when a bending operation indicated a mismatch in the distances between the sharply bent portions 73 and 74 of the vacuum mold and the corresponding distance between sharply bent portions 29 and 35 along the ring-like member 20.

According to the teachings of the present invention, the shape of the vacuum mold is adjusted initially so that under production conditions the vacuum mold develops a length between the sharply bent portions 73 and 74 that does not exceed the length between the sharply bent regions desired for the bent glass sheets and preferably is slightly shorter (on the order of approximately ¼ inch [6 mm]) than the desired glass sheet length between the sharply bent portions. In the ring-like member conforming to the present invention, the length between the sharply bent portions 29 and 35 can be adjusted by moving the first and second shaping rails relative to the mold reinforcement means 40 in a longitudinal direction such as to provide a length that conforms exactly to the desired length of the glass sheet. The vacuum mold thus temporarily shapes the glass sheet to a length between the sharply bent regions that is slightly shorter than the ultimate length desired. On depositing the glass sheet shaped as described on the vacuum mold from the latter to the ring-like member, the sheet drops into the central portion and into the intermediate areas of sharp bending and tends to flatten out with its upper outer ends conforming against the upper closed outer end portions 28 and 34 of the shaping rails 22 and 24.

Splitting the ring-like member into two independent shaping rails provides an ability adjustably fit the length of the ring-like member between its sharply bent portions without modifying the elevation of the upper closed end portions, the sharply bent intermediate portions and the lower inner end portions of its shaping rails. An adjusted ring-like member of slightly longer length between its sharply bent portions than the corresponding portions of the vacuum mold at operating temperatures enables the glass to develop a bend exactly conforming to the shape desired. Unless the vacuum mold is slightly shorter or exactly the size desired for the glass and the open ring-like member is exactly aligned with the vacuum mold during the transfer of the bent glass sheet, one or other sharply bent portions is likely to fail to match the curvature defined by the outline mold. Furthermore, the shaping rails must retain their horizontal alignment with corresponding portions of one another when the ring-like member is adjusted in length. Otherwise, the glass sheet may fall into a postion of skew on the ring-like member.

A typical vacuum mold for use in bending a glass sheet to a non-uniform shape having a distance of approximately 40 inches (100 cm) between the sharply bent portions 73 and 74 will expand approximately 0.1 inch for every increase in temperature of 300° F. (equivalent to approximately 1.4 mm for each temperature increase of 100° C.) over room temperature. In a typical operation, glass sheets are heated to a temperature of about 1210° F. (650° C.) on its upper surface and 1250° F. (675° C.) on its bottom surface when engaged by the upper vacuum mold. The glass sheet beyond the exit of the furnace continues to be supported by gas issuing from the hearth block 80 below the vacuum mold. The supporting gas is usually in a temperature range of about 1100° to 1300° F. (600° to 725° C.) and typically about 1250° F. (approximately 675° C.). Thus, in a typical operation, the vacuum mold obtains a temperature of about 500° to 750° F. (260° to 400° C.) after a period of operation due to its proximity to the hot gases from the hearth block. Since the ring-like member shuttles between the cooling station and the shaping station, and since the thin screen material that contacts the hot glass has a low heat transfer coefficient, the temperature of the ring-like member cycles within a lower temperature range than the temperature the vacuum mold attains. Therefore, while the vacuum mold expands so that the distance between the sharply bent regions 73 and 74 increases more than ⅛ inch (3 cm), the ring-like member does not change its dimensions to an extent approaching the difference in length between the sharply bent regions 29 and 35. This difference of change in length in the ring-like member varies with the nature of the cycle and the amount of time that the ring-like member spends at the cooling station compared to the time it spends immediately above the auxiliary hearth block at the shaping station. With all of these uncertainties, it has been found that splitting the ring-like member to provide two separable shaping rails with means to adjust the location of the two shaping rails relative to the reinforcement means by modifying a short gap between the inner ends of the shaping rails enables the operator to coordinate the distance along the ring-like member between the sharply bent regions with the distance between the corresponding sharply bent regions of the vacuum mold.

It is understood that when the distance between the sharply bent portions of the ring-like member is less than the corresponding distance along the heated vacuum mold, that the likelihood of the glass sheet to hang up on the ring-like member and not sag completely into the sharply bent portion of the shaping surface defined by the ring-like member is enhanced. However, when the distances between the sharply bent portions are exactly the same or the distance between the sharply bent regions along the ring-like member is slightly longer than the distance between the sharply bent regions along the vacuum mold, the glass sheet, dropping by impact onto the ring-like member, is able to assume the shape of the ring-like member and conform to the shape of the sharply bent region. It is most suitable to adjust the shape of the vacuum mold so that the distance between the sharply bent regions at working temperature is slightly less but within tolerance of the corresponding distance desired for the glass sheet. The split ring-like member is adjusted so that when the inner ends abut, the distance between the sharply bent regions is also slightly less than the corresponding distance desired for the glass sheet so that separating the shaping rails of the split ring-like member develops a desired distance for the glass sheet at the working temperature of said ring-like member.

The gap between the lower, inner ends of the shaping rails should remain relatively short, even when the shaping rails are separated the maximum distance needed to develop a proper bend. It has been determined that a gap of less than one inch (2.5 cm) will result in a shaped glass sheet developing sag that is within tolerances permitted by the customer in the central portion of the resulting tempered backlight.

A typical example of a production pattern fabricated using apparatus according to the present invention is a tempered backlight for automobiles having a central portion of gentle curvature (whose radius of curvature approximates 200 inches or 500 centimeters) between sharply bent portions (whose minimum radii of curvature approximate 6 inches or 15 centimeters) to form obliquely upwardly extending tips whose end portions lie in a horizontal plane 11½ inches (29.2 centimeters) above the horizontal plane tangential to the transverse center line of the backlight. The length of the backlight in its flat state prior to bending is 68 inches (173 centimeters) and its width across its broadest portion is 37.5 inches (95 centimeters).

The form of the invention shown and described in this specification represents an illustrative preferred embodiment thereof. It is understood that changes may be made without departing from the gist of the invention as defined in the claimed subject matter which follows.

I claim:

1. An open ring-like member adjustable in length for supporting a bent glass sheet having a flat or gently curved central portion flanked by sharply bent intermediate portions to form end portions angled from its central portion, comprising a first continuous shaping rail having a closed upper outer end portion, a sharply bent intermediate portion and lower inner end portions terminating short of the transverse center line of said ring-like member, said first shaping rail having an upward facing shaping surface conforming to the shape desired for a bent glass sheet portion supported thereby, a second continuous shaping rail having a closed upper outer end portion in a common horizontal plane with said closed upper end portion of said first shaping rail, a sharply bent intermediate portion in a common horizontal plane with said sharply bent intermediate portion of said first shaping rail, and lower inner end portions terminating short of the transverse center line of said ring-like member in closely spaced relation to the lower inner end portions of said first shaping rail and located in the same horizontal plane as the lower inner end portions of said first shaping rail, elongated reinforcement means surrounding said ring-like member, means controlling the relative movement of said shaping rails to the direction of the length of said reinforcement means, and means securing each of said shaping rails to said reinforcement means in fixed longitudinally adjustable positions relative thereto, said relative movement control means being constructed and arranged to adjust the distance between said sharply bent intermediate portions without removing said upper, closed outer end portions and said lower inner end portions from their respective common horizontal planes.

2. An outline mold adjustable in length for shaping a glass sheet to a shape of concave elevational configuration substantially symmetrical about its transverse center line and having sharply bent portions spaced longitudinally of its transverse center line to define a shape having a given depth of bend, said mold comprising a first continuous shaping rail having a closed outer upper end portion, an intermediate portion bent about a first transverse axis and longitudinally extending lower inner end portions extending toward the transverse center line of said outline mold from said bent intermediate portion, said first shaping rail having an upwardly facing surface conforming in elevation and outline to the shape desired for a first corresponding portion of a shaped glass sheet to one side of its transverse center line, a second continuous shaping rail having a closed outer upper end portion, an intermediate portion bent about a second transverse axis and longitudinally extending, lower inner end portions extending toward the transverse center line of said outline mold from said bent intermediate portion, said second shaping rail having an upwardly facing surface conforming in elevation and outline to the shape desired for a second corresponding portion of said shaped glass sheet to the other side of its transverse center line, elongated reinforcement means for supporting said first and second shaping rails in longitudinally spaced relation to said transverse center line with said closed upper end portions of said shaping rails located in a common essentially horizontal plane, and means including members having elongated slots extending in the length direction of said reinforcement means for adjustably securing the longitudinal positions of said shaping rails relative to said reinforcement means without disturbing the horizontal planes of location for said outer upper end portions and said lower inner end portions.

3. An outline mold as set forth in claim 2, wherein said securing means comprises pairs of cooperating tabs comprising first tabs extending outward from said shaping rails and second tabs extending inward from said reinforcement means to overlapping positions with said first tabs of each pair and means including a round hole and a longitudinally extending slot for the cooperating tabs of each pair and nut and bolt means releasably securing the first tab of each pair to the second tab of each pair at any one of a plurality of positions along the length of said tabs.

4. An outline mold as set forth in claim 3, in combination with a vacuum mold having a downwardly facing apertured wall including sharply bent intermediate portions shaped to conform approximately to the shape of said outline mold and adapted to release a shaped glass sheet from vacuum engagement against said downwardly facing apertured wall for transfer to said outline mold, said nut and bolt means securing said tabs to one another in positions such that said first and second shaping rails are adjustably positioned relative to said reinforcement means to space their sharply bent intermediate portions from one another a distance at least equal to and at most, slightly more, than the corresponding distance on the downwardly facing wall of said vacuum mold.

5. Apparatus for bending a glass sheet as set forth in claim 1, further comprising a vacuum mold having a downwardly facing shaping surface of concave elevation defining a lower central portion, a pair of sharply bent intermediate portions having a given distance therebetween at operating conditions, and upper end portions extending longitudinally upward and outward from each of said sharply bent intermediate portions, said open ring-like member having upper outer closed end portions and sharply bent intermediate portions and a lower central portion, said members having elongated slots being adjusted in position so that the distance between said sharply bent intermediate portions of said ring-like member is at least equal, and preferably, slightly longer than the distance between said sharply bent intermediate portions of said vacuum mold, and means for moving said ring-like member to a position below said vacuum mold with said lower central portions in vertical alignment, whereby when a heat-softened glass sheet is released from vacuum engagement by said vacuum mold, it drops onto said ring-like member and conforms to a shape corresponding to that defined by said ring-like member, particularly in said sharply bent intermediate portions.

* * * * *